(12) United States Patent
Garritsen (10) Patent No.: US 7,307,632 B1
(45) Date of Patent: Dec. 11, 2007

(54) FONT EMULATION

(75) Inventor: Frido Garritsen, Hayward, CA (US)

(73) Assignee: Silicon Motion, Inc., Milpitas, CA (US)

( * ) Notice: Subject to any disclaimer, the term of this patent is extended or adjusted under 35 U.S.C. 154(b) by 815 days.

(21) Appl. No.: 09/755,902

(22) Filed: Jan. 3, 2001

(51) Int. Cl.
*G08T 11/00* (2006.01)

(52) U.S. Cl. .............. 345/471; 345/443; 345/467; 345/471; 345/472.1; 345/698; 345/699

(58) Field of Classification Search .......... 345/467, 345/471, 469.1, 472.1, 670, 551, 501, 443, 345/698, 699; 382/298, 299, 300, 301
See application file for complete search history.

(56) References Cited

U.S. PATENT DOCUMENTS

| | | | | |
|---|---|---|---|---|
| 4,573,199 A | * | 2/1986 | Chen et al. | 382/301 |
| 5,742,298 A | * | 4/1998 | Bril et al. | 345/501 |
| 6,101,620 A | * | 8/2000 | Ranganathan | 714/718 |
| 6,337,687 B1 | * | 1/2002 | Lee | 345/472 |
| 6,384,827 B1 | * | 5/2002 | Dawkins | 345/467 |
| 6,392,660 B2 | * | 5/2002 | Karjalainen | 345/660 |
| 6,486,895 B1 | * | 11/2002 | Robertson et al. | 345/776 |

FOREIGN PATENT DOCUMENTS

JP    A 07-191856    *  7/1995

OTHER PUBLICATIONS

IBM technical Disclosure—Font Changer, 1993, Cross ref. 0018-8689-36-5-491.*
Video Electronics Standards Association, Vesa Bios Extension (VBE) Core Functions Standard Version: 3.0, Sep. 16, 1998, pp. 1-87.

* cited by examiner

*Primary Examiner*—Kimbinh T. Nguyen
(74) *Attorney, Agent, or Firm*—Blakely, Sokoloff, Taylor & Zafman LLP (57) ABSTRACT

A method and apparatus for Font Emulation are disclosed. In one embodiment, the method comprises stripping a first portion from a first font to emulate a second font upon request for such a second font. In an alternative embodiment, the apparatus comprises a processor and a memory, the processor stripping a first portion from a first font to emulate a second font. The method and apparatus may further include stripping a second portion from a first font, and such may be performed by the processor. Alternatively, the method may include copying a first font into memory.

44 Claims, 10 Drawing Sheets

FONT EMULATION

BACKGROUND OF THE INVENTION

1. Field of the Invention

The invention relates generally to display of fonts on a video system and to BIOS programming, and more particularly to a BIOS for a graphics system and improving that BIOS.

2. Description of the Related Art

Designers of computer systems use a BIOS chip to store firmware which the system utilizes either for low-level functions or initialization routines. Because the BIOS is used only at the start of the computer or for low-level routines it is not economical for it to take up a lot of space either physically or in memory. Those parts of the BIOS routines which are used more frequently still should be optimized for speed and optimized for storage space so that they do not significantly consume memory that would be otherwise utilized by actual application programs or the operating system typically used on a computer. Thus, economizing on code or other data stored in BIOS is of the utmost priority in the design of the BIOS. More recently, BIOS chips have been utilized in subsystems such as graphic systems to implement functions which are used repeatedly. Those functions are preferably stored in the BIOS in a processing efficient and space efficient manner. Thereby, the functions can be executed quickly by the processor, are easily available to the programmer, and do not take up a lot of space either physically on the board or in the logical memory space addressable by a video or graphics processor.

The implementation of BIOS for graphic subsystems has been used in laptop computers where a limitation of 48K or 48 kilobytes of space was available. However that convention is also becoming more common in desktop systems, and in desktop systems the graphics BIOS is limited to 32K because of older conventions of the VGA graphics subsystems. Therefore, it is desirable to find a way to save memory space when implementing the BIOS, in particular when implementing the BIOS for a desktop graphics subsystem.

Typically, the BIOS of a graphics system will have four fonts stored within it. These include 8×8, 8×14, 9×14, 8×16, and 9×16 fonts. In the case of the 8×14 font, each character is 8 pixels wide and 14 pixels high when displayed on the screen. With these fonts available in the BIOS, programmers can always rely on their presence for use with application programs. Typically, the 8×14 and 8×16 fonts have characters which are 7 pixels wide and the eighth column of pixels is always left blank, thereby allowing the characters to be placed side-by-side without having them appear too close to each other. Likewise, the 9×14 and 9×16 fonts are typically used only when a programmer wishes to have a customized character. The programmer programs the characters to be used in the 9×14 or 9×16 font, specifying whether each pixel will or will not be turned on, and any characters not programmed in the 9×14 or 9×16 font default to the corresponding character in the corresponding 8×14 or 8×16 font.

SUMMARY OF THE INVENTION

A method and apparatus for Font Emulation is disclosed. In one embodiment, the method of simulating a second font utilizing a first font comprises stripping a first portion from the first font. In an alternative embodiment, a machine-readable medium suitable for font emulation contains a plurality of executable instructions, which when executed on a processor cause the processor to perform a method of emulating a second font utilizing a first font, and the method comprises stripping a first portion from the first font and stripping a second portion from the first font. In another alternative embodiment, a system for font emulation comprises a processor; and a first memory coupled to the processor; the processor emulating a second font by stripping a first portion from a first font and stripping a second portion from the first font. In a further alternative embodiment, a method of simulating a second font comprising a set of characters utilizing a first font comprising a set of characters, comprises stripping a first portion from a first character of the first font. The method and apparatus may further comprise copying a font into memory and may further comprise storing an emulation routine in memory.

BRIEF DESCRIPTION OF THE DRAWINGS

The present invention is illustrated by way of example and not limitation in the accompanying figures.

DETAILED DESCRIPTION

A method and apparatus for Font Emulation is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
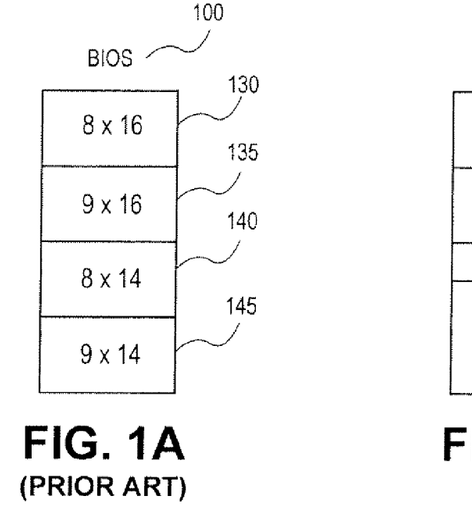
FIG. 1a illustrates a prior art organization of memory.
Figure 1B:
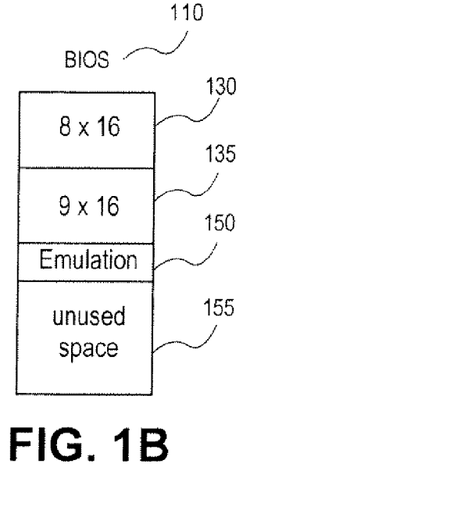
FIG. 1b illustrates an organization of memory according to one embodiment of the present invention.
Figure 1C:
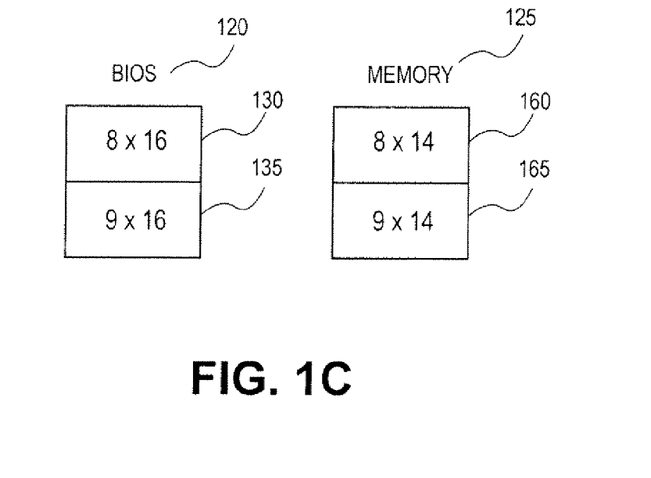
FIG. 1c illustrates an organization of memory according to an alternative embodiment of the present invention.

FIG. 1a shows a prior art portion of the BIOS memory. BIOS memory 100 includes 8×16 font 130, 9×16 font 135, 8×14 font 140 and 9×14 font 145. Turning to FIG. 1b, BIOS memory 110 is displayed which displays one embodiment of the invention including an 8×16 font 130, a 9×16 font 135, an emulation routine 150, and an unused space 155. Emulation routine 150 utilizes the stored 8×16 font 130 and 9×16 font 135 to emulate an 8×14 font 140 and a 9×14 font 145. FIG. 1c displays an alternate embodiment of the invention in which BIOS memory 120 includes an 8×16 font 130 and a 9×16 font 135, and memory 125 includes an 8×14 font 160 and a 9×14 font 165. By storing the emulation routine 150 in the BIOS instead of the two fourteen line fonts (8×14 font 140 and 9×14 font 145), space is saved in the BIOS. This space may either be used for other features and routines, or may not have been available because the BIOS was ported from a 48k memory and targeted at a 32k memory.

Figure 2:
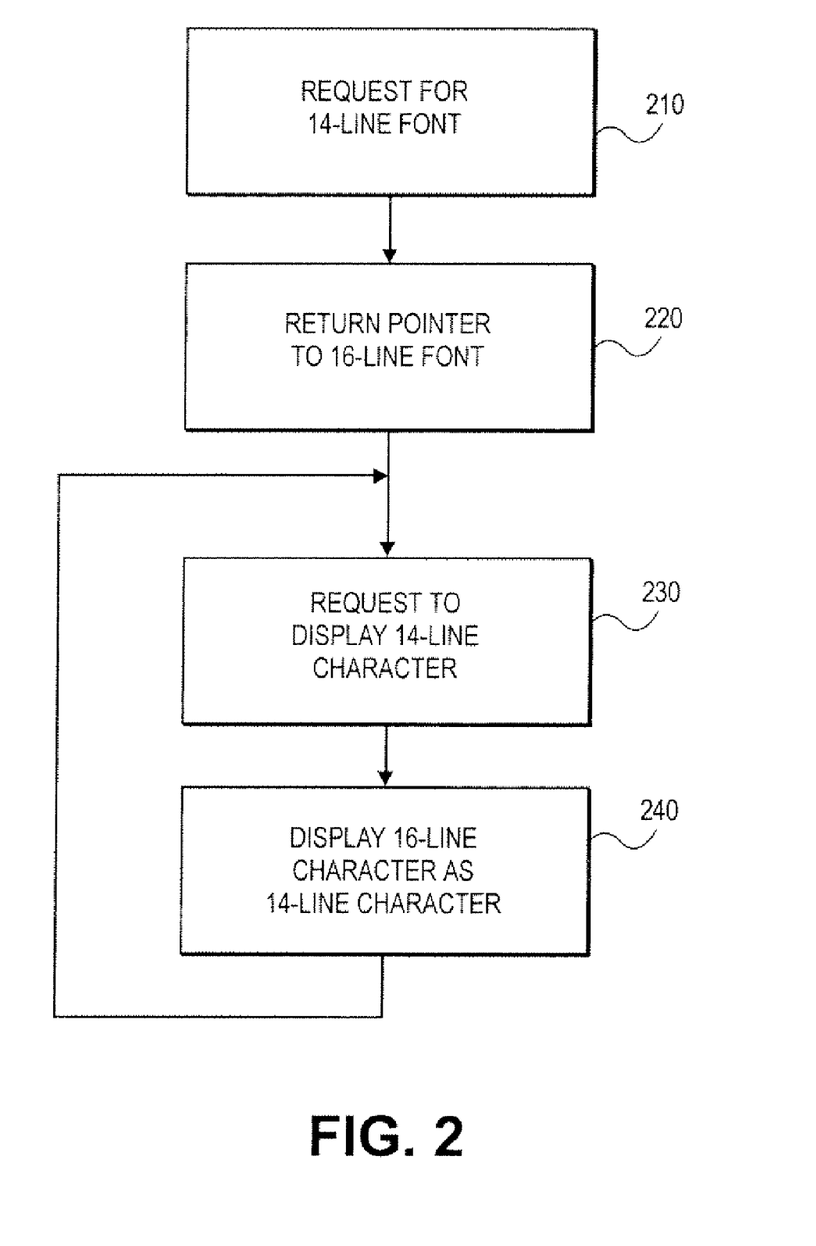
FIG. 2 illustrates an implementation of one embodiment of the present invention.

Turning to FIG. 2, one embodiment of the method of the present invention is illustrated. In request 210 a request is made by an application program or operating system routine for the fourteen line font used for display. In return 220, a pointer to the sixteen line font such as 8×16 line font 130 is returned. The request in request 210 would have been in this case for 8×14 font 140. At a later point, request 230 for display is made in which a single character of the fourteen line font is supposed to be displayed. In response to request 230, the BIOS emulation routine utilizes a sixteen line character from 8×16 font 130 to display 240 a fourteen line character, thereby emulating 8×14 font 140. Note that request 230 for display and display 240 can be repeated as often as necessary to display as many characters as necessary. Furthermore, request 230 may involve requesting display of a character in text mode in which case fourteen lines of pixels must be output to the font generator or request 230 may just as easily be a request for a display of a character in graphics mode in which case the BIOS would send the character directly to graphics or display device which would in turn display it. The font generator is used when displaying characters in text mode, and is an integral part of the graphics system. Text mode is characterized by display of characters rather than pixels. In graphics mode, pixels are mapped directly to the screen, and programs or systems used in this mode are not designed to use a font generator for text.

Note that the embodiment displayed or illustrated in FIG. 2 corresponds best to the embodiment illustrated in FIG. 1b in which an emulation routine is part of the BIOS memory and is used to emulate a fourteen line font based on a sixteen line font. This emulation is done by utilizing all but the very first or top line and the very last or bottom line of each character of the sixteen line font when the fourteen line font is requested.

Figure 3:
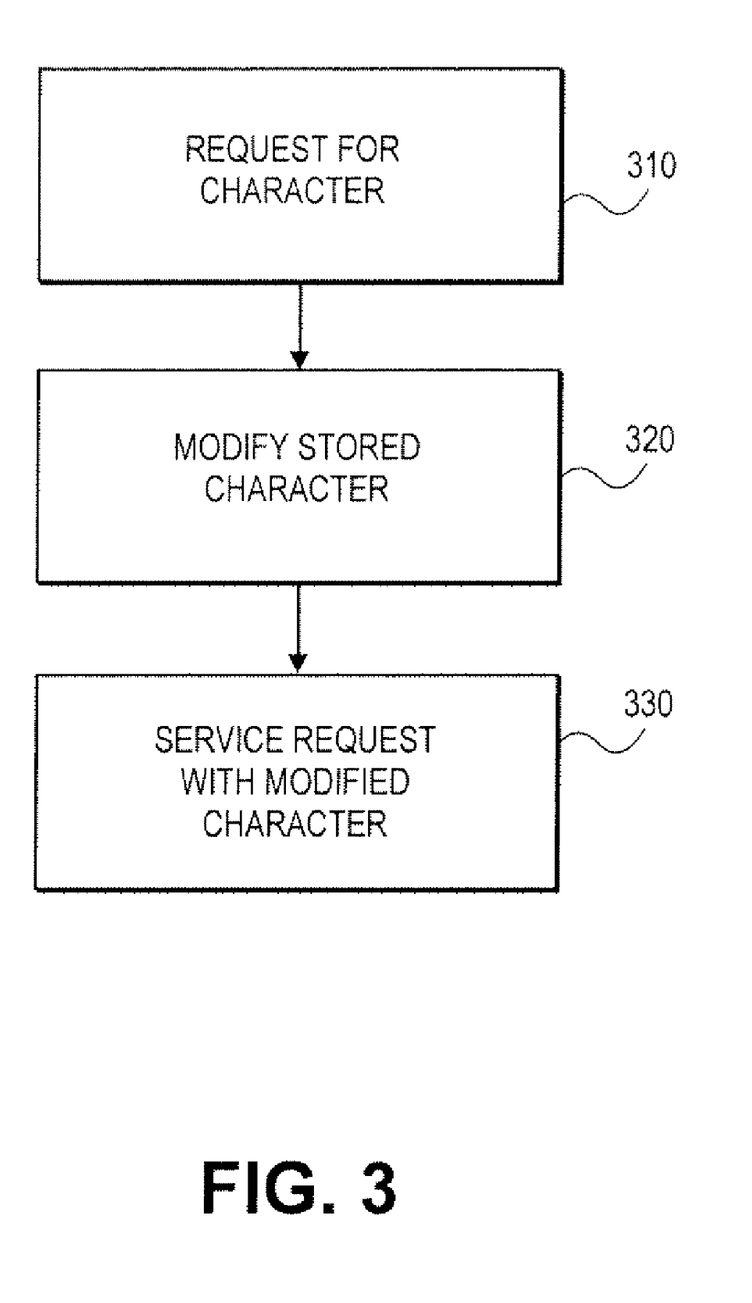
FIG. 3 illustrates an implementation of an alternative embodiment of the present invention.

Turning to FIG. 3, another alternate embodiment of the method of the present invention is illustrated. Request 310 is a request for a character. Should that character be in one of the fourteen line fonts and the emulation routine be in use, then modify 320 represents modification of the stored character of the sixteen line font and service of request 330 represents servicing the request 310 for a character by returning the modified character created in modification 320.

Figure 4A:
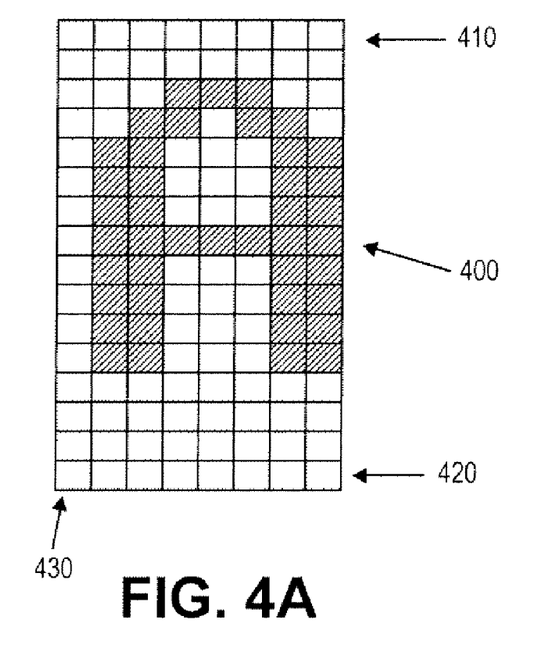
FIG. 4A illustrates an 8×16 character in one embodiment.

FIG. 4A illustrates the character 'A'. The character 400 is an 8×16 block of pixels. Line 410 at the top at the top of the block and line 420 at the bottom of the block are removed before character 400 is returned to the routine requesting it or forwarded to either the font generator or the graphics or video engine for display. Note that column 430 of pixels is blank in the 8×14 and 8×16 fonts of the VGA system. The first column, or the leftmost column of each character is typically left blank so that there will be space between the characters when they are displayed.

Figure 4B:
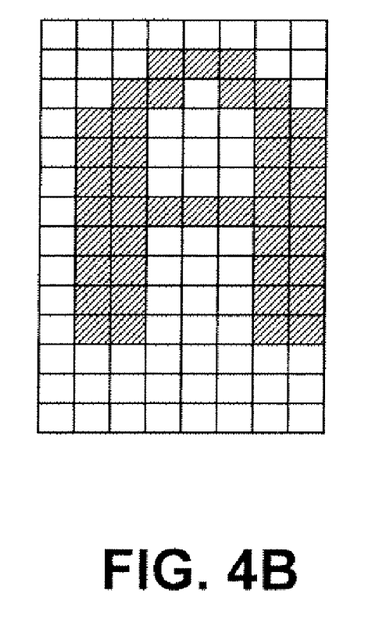
FIG. 4B illustrates an 8×14 character produced from the character of FIG. 4A by one embodiment.
Figure 4C:
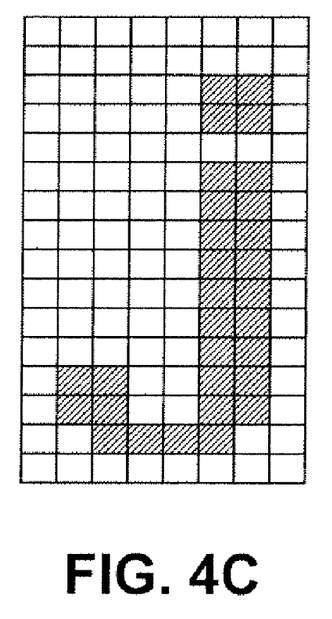
FIG. 4C illustrates another 8×16 character in one embodiment.
Figure 4D:
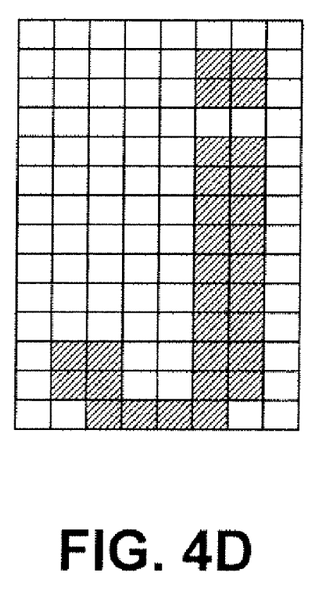
FIG. 4D illustrates an 8×14 character produced from the character of FIG. 4C by one embodiment.
Figure 4E:
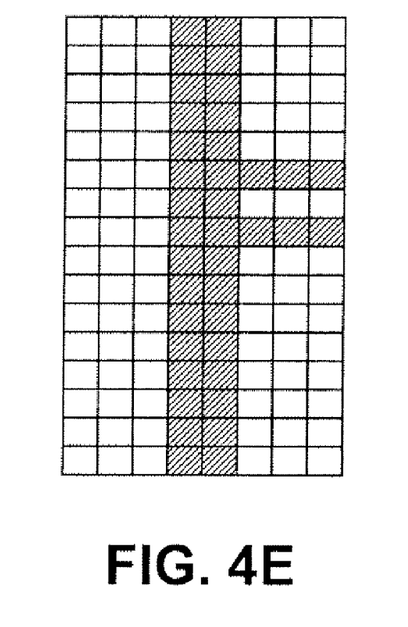
FIG. 4E illustrates yet another 8×16 character in one embodiment.
Figure 4F:
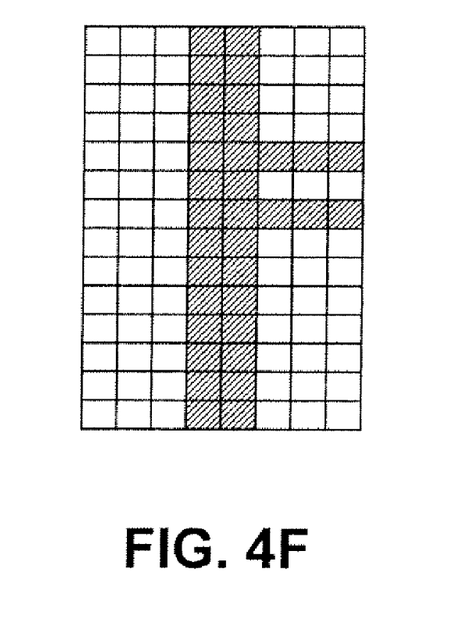
FIG. 4F illustrates an 8×14 character produced from the character of FIG. 4E by one embodiment.
Figure 4G:
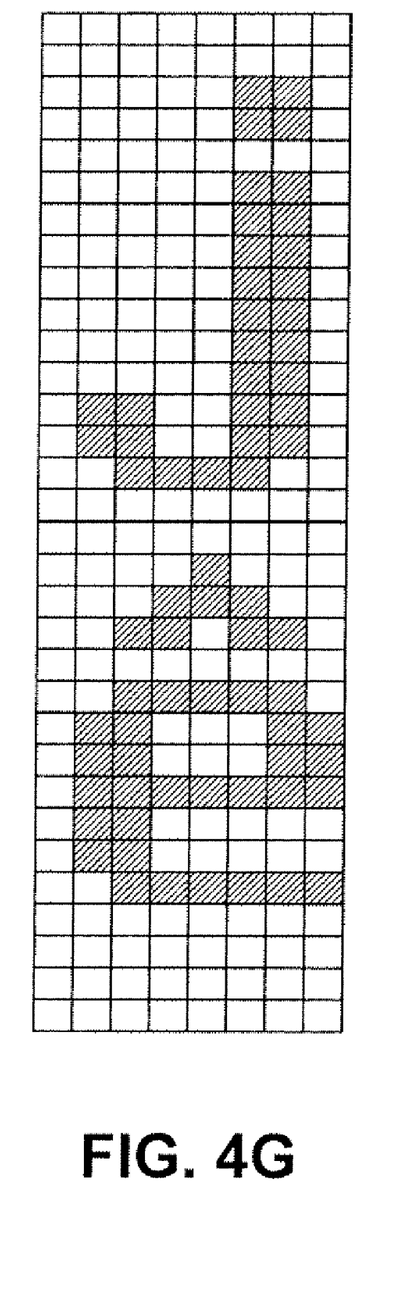
FIG. 4G illustrates a pair of 8×16 characters in one embodiment.
Figure 4H:
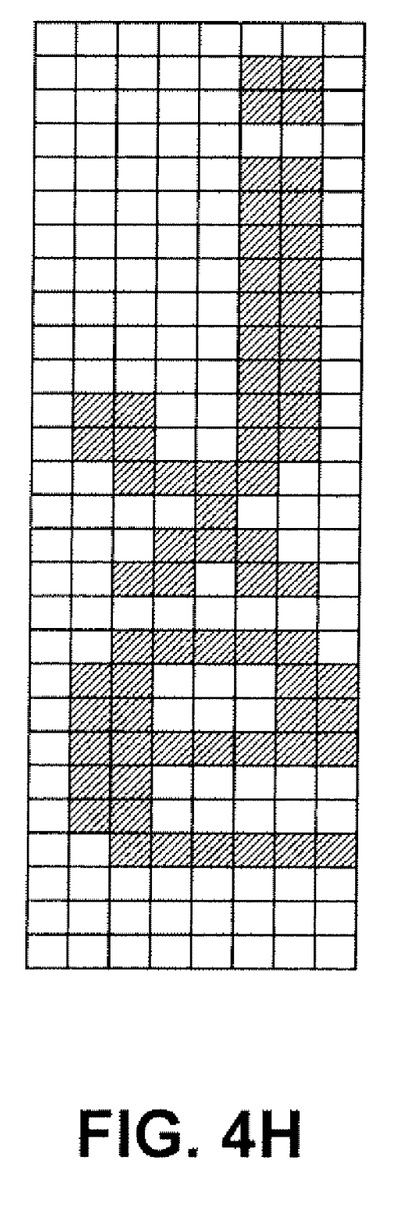
FIG. 4H illustrates the pair of 8×14 characters produced from the characters of FIG. 4G by one embodiment.

FIG. 4B illustrates the resulting character 'A' after modification as described. Furthermore, FIGS. 4C and 4D illustrate a character 'j' before and after a similar modification. Likewise, FIGS. 4E and 4F illustrate one of the border characters (ASCII HEX 98) before and after the modification. Finally, FIGS. 4G and 4H illustrate two characters on adjacent rows on the screen, thus illustrating how the separating space between the two characters may vanish after the transformation or modification.

As will be appreciated, the descriptions up until now have focused on the case originally illustrated in FIG. 1b of an emulation routine included in the BIOS subsystem. Alternatively, the embodiment of FIG. 1c where the fourteen line fonts are stored in memory other than the BIOS may also be used. In this case, the 8×14 font 160 and the 9×14 font 165 must somehow be loaded into memory, typically into random access memory at the time the system begins operation, but they may also be stored on a hard disk drive or in a flash memory, such as a flash $E^2$ PROM. In this case a request for a pointer to the fourteen line font, either the 8×14 or 9×14 line font, would return a pointer to those fonts in memory rather than a pointer to the sixteen line fonts as would occur with the emulation routine. Furthermore, because these fonts would be loaded in memory, it would not be necessary for the pixels to be stripped off each time the character is displayed. Alternatively, in one case, the 8×14 font 160 and 9×14 font 165 may be generated directly from the 8×16 font 130 and 9×16 font 135 respectively when the system is initialized. Also, the 8×14 font 160 and the 9×14 font 165 may be stored in some form of nonvolatile memory and retrieved at the time the system begins operation or as needed to complete operations.

Figure 5A:
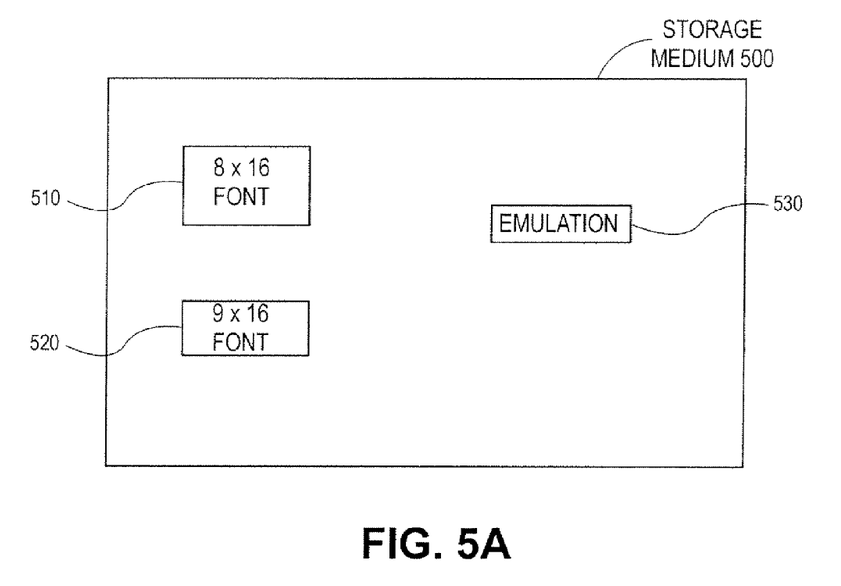
FIG. 5a illustrates a functional block diagram of an embodiment of the present invention.
Figure 5B:
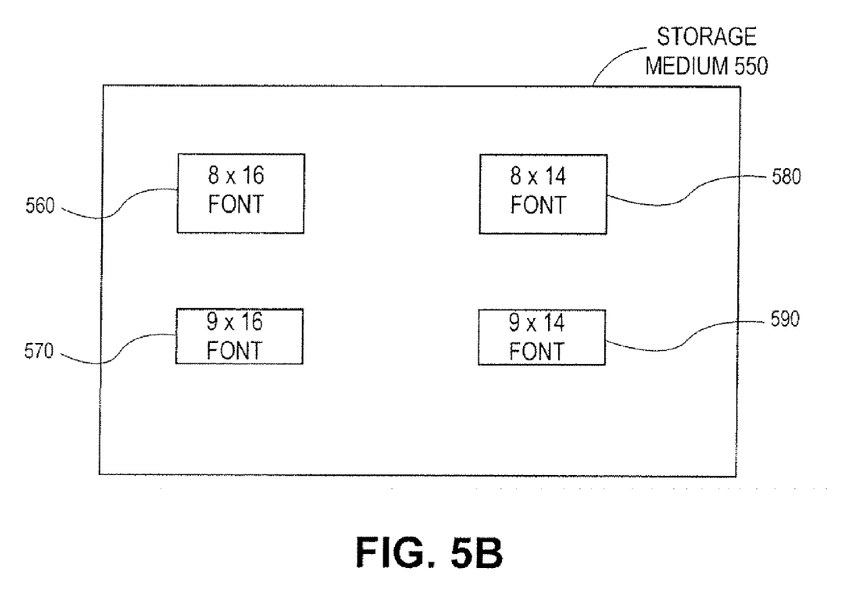
FIG. 5b illustrates a functional block diagram of an alternative embodiment of the present invention.

Turning to FIG. 5a, the present invention as stored in a storage medium 500 is illustrated. Storage medium 500 contains 8×16 font 510, 9×16 font 520 and emulation routine 530. Storage medium 500 may be a ROM or read only memory. A PROM, or Programmable Read Only Memory, an EPROM, or Erasable Programmable Read Only Memory, or an EEPROM, and Electrically Erasable Programmable Read Only Memory, and such an EE or $E^2$ PROM may be of the flash variety. Additionally storage medium 500 may be a magnetic or optical disk or some other optical storage medium, it may also be some form of carrier wave. Turning to FIG. 5b, an alternative embodiment of the present invention in the storage medium 550 is displayed. Storage medium 550 includes 8×16 font 560, 9×16 font 570, 8×14 font 580, and 9×14 font 590. Storage medium 550 may be of the same type of media as storage medium 500 and both storage medium 500 and storage medium 550 may store the components such as 8×16 font 510 collectively or individually and each component may be stored across several pieces of media or on a single medium or across several types of media.

Figure 6A:
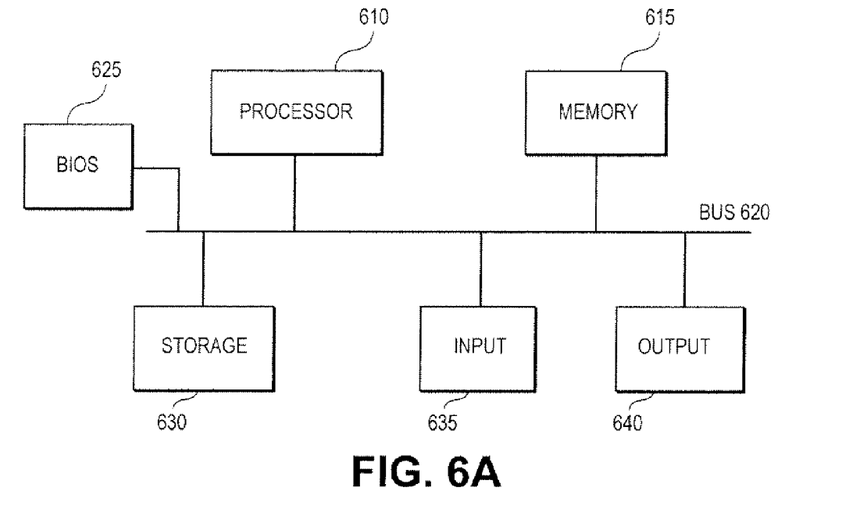
FIG. 6a illustrates a functional block diagram of a system suitable for use with an embodiment of the present invention.

Turning to FIG. 6a, one embodiment of a system suitable for use with the present invention is illustrated. The system includes processor 610 coupled to memory 615 through bus 620. Processor 610 is likewise coupled to BIOS 625 storage 630, input 635, and output 640 through bus 620. Note however, that BIOS 625 need not be coupled directly to processor 610 through bus 620. Alternatively BIOS 625 could be coupled directly to processor 610 without the intervening bus 620. Note that bus 620, while it is illustrated as one continuous bus connecting all devices, may be implemented in some form of star pattern where bus 620 connects each component such as input 635 or output 640 directly to processor 610 without allowing for direct communication between, for instance, input 635 and output 640. BIOS 625 would correspond to any of BIOS 100, BIOS 110 or BIOS 120, respectively. For example, processor 610 would be able to utilize data stored in BIOS 625 such as the emulation routine 150 or 8×16 font 130. The fonts such as 8×14 font 160 and 9×14 font 165 which are stored in memory 125 of FIG. 1c would likely be stored in memory 615 of FIG. 6a, but might also be stored in storage 630. The fonts may even be received from input 635 and all of the fonts would typically be displayed on output 640.

Figure 6B:
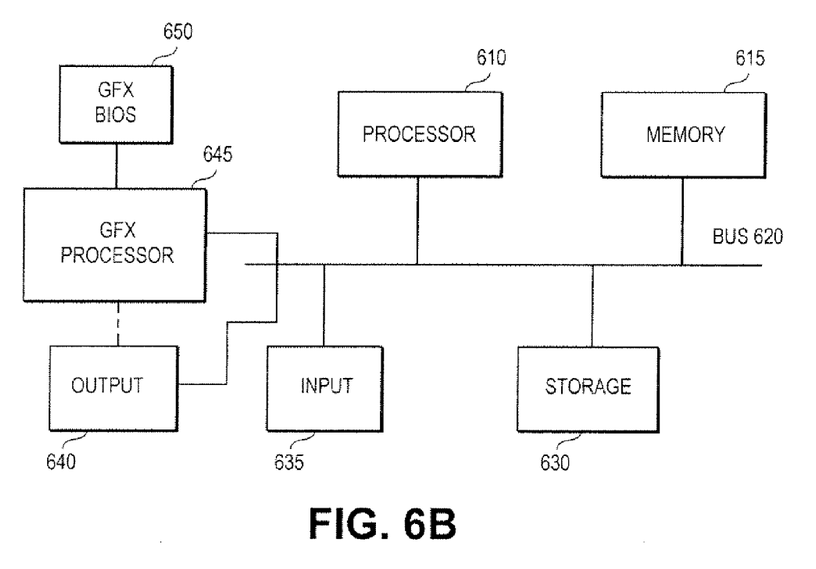
FIG. 6b illustrates a functional block diagram of a system suitable for use with an alternative embodiment of the present invention.

Turning to FIG. 6b, an alternative embodiment of a system for use with the present invention is displayed. Processor 610 is coupled to memory 615 through bus 620. Also coupled to processor 610 through bus 620 is graphics processor 645, input 635, output 640, and storage 630. Note again that bus 620 is illustrated as being logically connected to all components of the system. However, it might also be implemented as a star network or it might allow for connection or coupling of some components of the system without allowing for all components of the system to be coupled point to point to each other. Graphics processor 645 also has a connection or coupling to output 640 to allow graphics processor 645 to display graphics images on output 640. Graphics BIOS 650 is coupled to graphics processor 645 and graphics BIOS 650 would be something such as a VGA BIOS or other similar BIOS such as the BIOS shown as BIOS 100 or BIOS 110 or BIOS 120. Note that memory 615 and storage 630 may utilize the same type of medium for storage of data as mentioned previously with respect to storage medium 500 and storage medium 550. Note also that BIOS such as BIOS 625 or graphics BIOS 650 typically would be implemented as some sort of read only memory as mentioned previously. Each of these BIOS components may also be implemented using any of the storage media discussed with respect to storage medium 500 and storage medium 550.

The present invention has been described with particular attention to emulation of an 8×14 font with an 8×16 font in an emulation routine. It has also been described with respect to utilizing an 8×14 or 9×14 font in RAM. It will be appreciated that the 9×14 and 9×16 fonts utilized in the VGA system, in one embodiment, are fonts which are programmable and in which only certain characters exist, those characters which the system designer or possibly the operating system or application programmer chose to modify. As such, utilization of the 9×14 font may only occur when those modified characters exist. For instance if a programmer or designer chose to modify the 'Q' character but not the 'R' character, then use of the 'Q' character would only involve the 8×14 or 8×16 font, whereas use of the 'R' character would involve either the 9×14 or 9×16 font. As a result, the 9×14 or 9×16 font may well not include the blank line described earlier with respect to the 8×16 font and it will typically only include some of the characters thus requiring a smaller portion of space than that utilized by the corresponding 8×16 or 8×14 font. It will further be appreciated that the BIOS memory described herein can be combined with the graphics processor such as graphics processor 645 or with a processor such as processor 610, thereby integrating the two components on a single piece of silicon. Furthermore, it will be appreciated that any of the components of FIGS. 6a and 6b may be integrated to a greater or lesser degree or separated out into subcomponents to a greater or lesser degree than that displayed in FIGS. 6a and 6b. In the case of the emulation of the 8×14 and 9×14 fonts discussed herein, a gain of approximately 3 kilobytes of space in the BIOS area was achieved in one embodiment. It will be appreciated that in emulating other fonts, different gains may be achieved and this method and apparatus may be applicable to the emulation of a variety of different fonts and other symbols which are amenable to a simple transformation involving removal of a first or a last line or both.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method of simulating a second font utilizing a first font, the method comprising:
simulating the second font using the first font, to display on an output of a display device, by automatically stripping a top line and a bottom line from the first font;
wherein the first font comprises an n×(m+2) font and the second font comprises an n×m font.

2. The method of claim 1 wherein:
the first font comprises a 9×16 font; and
the second font comprises a 9×14 font.

3. The method of claim 1 wherein the first font comprises a 8×16 font; and the second font comprises a 8×14 font.

4. The method of claim 1 further comprising:
copying the n×(m+2) font from BIOS into memory to simulate the second font.

5. A computer-readable medium containing a plurality of executable instructions, which when executed on a processor cause said processor to perform a method of emulating a second font utilizing a first font, the method comprising:
automatically stripping a top line and a bottom line from the first font to emulate the second font using the first font, to display the second font on an output of a display device;
wherein the first font comprises an n×(m+2) font and the second font comprises an n×m font.

6. The computer-readable medium of claim 5 wherein m=14.

7. An apparatus for emulating a second font utilizing a first font, comprising:
means for automatically stripping a top line and a bottom line from the first font to emulate the second font using the first font, to display the second font on an output of a display device;
wherein the first font comprises an n×(m+2) font and the second font comprises an n×m font.

8. The apparatus of claim 7 wherein m=14.

9. A system, comprising:
a BIOS memory, the BIOS memory storing a first font and instructions; and
a processor coupled to the BIOS memory, the processor is configured to emulate a second font using the first font, to display the second font on an output of a display device, by automatically stripping a top line and a bottom line from the first font in response to the instructions, wherein the second font is different from the first font.

10. The system of claim 9 wherein:
the processor emulating the second font by stripping a portion from the first font in response to receiving an access request for the second font.

11. The system of claim 9 further comprising:
a first memory coupled to the processor, the processor copying the first font from the BIOS memory into the first memory to emulate the second font.

12. The system of claim 10 wherein:
the portion comprises a top line and a bottom line of an n×(m+2) font.

13. The system of claim 12 wherein:
the second font comprises an n×m font.

14. A method of simulating a second font comprising a set of characters utilizing a first font comprising a set of characters, the method comprising:
automatically stripping a top line of each character of the first font; and
automatically stripping a bottom line of each character of the first font, wherein the automatically stripping the top line and the bottom line simulates the second font using the first font, to display the second font on an output of a display device;
wherein the first font comprises an n×(m+2) font and the second font comprises an n×m font.

15. The method of claim 14 wherein m=14.

16. The method of claim 15 wherein n is one of: 8 and 9.

17. The method of claim 14 further comprising:
copying the first font from BIOS into memory to simulate the second font.

18. A method to start a data processing system, the method comprising:
emulating a second font using a first font stored in a BIOS memory of the data processing system, to display the second font on an output of a display device, by automatically stripping a top line and a bottom line from the first font in response to instructions stored in the BIOS memory.

19. The method of claim 18, further comprising:
copying the first font from the BIOS memory to a first memory of the data processing system to emulate the second font.

20. The method of claim 18, wherein said emulating comprises:
stripping a portion from the first font.

21. The method of claim 20, wherein the portion comprises a top line of the each character of the first font and a bottom line of each character of the first font.

22. The method of claim 21, wherein the second font is of two lines of pixels shorter than the first font.

23. A computer-readable medium containing a plurality of executable instructions, which when executed on a processor cause said processor to perform a method to start a data processing system, the method comprising:
emulating a second font using a first font, to display the second font on an output of a display device, by automatically stripping a top line and a bottom line from the first font stored in a BIOS memory of the data processing system in response to instructions stored in the BIOS memory, wherein the second font is different from the first font.

24. The medium of claim 23, wherein the method further comprises:
copying the first font from the BIOS memory to a first memory of the data processing system to emulate the second font.

25. The medium of claim 23, wherein said emulating comprises:
stripping a portion from the first font.

26. The medium of claim 25, wherein the portion comprises a top line of the each character of the first font and a bottom line of each character of the first font.

27. The medium of claim 26, wherein the second font is of two lines of pixels shorter than the first font.

28. A data processing system, comprising:
means for emulating a second font using a first font, to display the second font on an output of a display device, by automatically stripping a top line and a bottom line from the first font stored in a BIOS memory of the data processing system in response to instructions stored in the BIOS memory, wherein the second font is different from the first font.

29. The data processing system of claim 28, further comprising:
means for copying the first font from the BIOS memory to a first memory of the data processing system to emulate the second font.

30. The data processing system of claim 28, wherein said means for emulating comprises:
means for stripping a portion from the first font.

31. The data processing system of claim 30, wherein the portion comprises a top line of the each character of the first font and a bottom line of each character of the first font.

32. The data processing system of claim 31, wherein the second font is of two lines of pixels shorter than the first font.

33. The method of claim 1, wherein the top line and the bottom line are stripped unconditionally from the first font to simulate the second font.

34. The method of claim 5, wherein the top line and the bottom line are stripped unconditionally from the first font to simulate the second font.

35. The apparatus of claim 7, wherein the top line and the bottom line are stripped unconditionally from the first font to simulate the second font.

36. The method of claim 14, wherein the top line and the bottom line are stripped unconditionally from each character of the first font to simulate the second font.

37. The method of claim 1, further comprising
using all lines of the first font except the top line and the bottom line to display the second font.

38. The computer-readable medium of claim 5, further containing the plurality of executable instructions, which when executed on the processor cause said processor to perform the method further comprising
using all lines of the first font except the top line and the bottom line to display the second font.

39. The apparatus of claim 7, further comprising
means for using all lines of the first font except the top line and the bottom line to display the second font.

40. The system of claim 9, wherein the processor is further configured to use all lines of the first font except the top line and the bottom line to display the second font.

41. The method of claim 14, further comprising
using all lines of the first font except the top line and the bottom line to display the second font.

42. The method of claim 18, further comprising
using all lines of the first font except the top line and the bottom line to display the second font.

43. The computer-readable medium of claim 23, further containing the plurality of executable instructions, which when executed on the processor cause said processor to perform the method further comprising
using all lines of the first font except the top line and the bottom line to display the second font.

44. The data processing system of claim 28, further comprising
means for using all lines of the first font except the top line and the bottom line to display the second font.

* * * * *